United States Patent Office 3,452,040
Patented June 24, 1969

---

3,452,040
5,5-DISUBSTITUTED HYDANTOINS
Andre L. Langis, Montreal, Quebec, Canada, assignor to American Home Products Corporation, New York, N.Y., a corporation of Delaware
No Drawing. Filed Jan. 5, 1966, Ser. No. 531,322
Int. Cl. C07d 49/32; A61k 27/00
U.S. Cl. 260—309.5      6 Claims

ABSTRACT OF THE DISCLOSURE

There are disclosed herein the following 5-methyl hydantoins substituted in position-5 with the following substituents:

N-piperidylmethyl,
N-morpholinomethyl,
N-1,2,3,4-(tetrahydroisoquinolylmethyl),
N'-benzyl-N-piperazinylmethyl, hexamethyleneiminomethyl,
N-methylbenzylaminomethyl,
N-methyl-(2-chlorobenzylaminomethyl),
N-methyl-(3,4-dichlorobenzylaminomethyl),
N-methyl-4-(methoxybenzylaminomethyl),
N-methyl-(3-methoxybenzylaminomethyl),
N-isopropylbenzylaminomethyl, and
N-methyl-(3,4-dimethoxybenzylaminomethyl).

The compounds are useful as anti-inflammatory agents, and methods for their preparation and use are also disclosed.

---

The present invention relates to new 5,5-disubstituted hydantoins and to their pharmacologically acceptable salts as well as to intermediates used in their preparation. The compounds of this invention possess anti-inflammatory activities when administered locally or orally, and are useful in the treatment of inflammatory conditions. For local administration they may be formulated in the form of solutions, creams, or lotions, containing from 0.5 to 5 percent of the active ingredient, and may be applied locally to the inflamed area several times a day. For oral administration, they may be formulated with excipients such as starch, lactose, magnesium stearate or magnesium silicate in the form of tablets or capsules containing from 25 to 250 mg. per dosage form.

More specifically, the compounds of this invention possess the general structure.

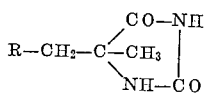

in which R represents a monovalent basic radical such as the radical of a nitrogen-containing heterocycle, for example, piperidine, morpholine, tetrahydroisoquinoline, N-benzylpiperazine, or hexamethylenimine, or of a substituted benzylamine, such as, for example, N-isopropylbenzylamine, or N-methylbenzylamine; the benzyl radical in the latter group of substituents may also be suitably substituted, with substituents such as halogen or lower alkoxy groups being preferred.

The compounds of this invention may be conveniently prepared by reacting a suitably substituted secondary amine of the formula RR¹NH, in which R has the significance defined above and R¹ represents a lower alkyl group containing from one to three carbon atoms, or is a part of the heterocycle represented by the symbol R, with chloroacetone to obtain the intermediate (tertiary amino)-ketone of the formula RR¹NCH₂COCH₃ in which R and R¹ have the significance defined above. Examples of such (tertiary amino)ketones are N-morpholinylacetone,
N-1,2,3,4-tetrahydroisoquinolylacetone,
N'-benzyl-N-piperazinylacetone,
N-hexamethyleneiminoacetone,
N-benzyl-N-methylaminoacetone,
N-2-chlorobenzyl-N-methylaminoacetone,
N-3,4-dichlorobenzyl-N-methylaminoacetone,
N-4-methoxybenzyl-N-methylaminoacetone,
N-3-methoxy-benzyl-N-methylaminoacetone,
N-benzyl-N-isopropylaminoacetone and
N-3,4-dimethoxybenzyl-N-methylaminoacetone.

The latter (tertiary amino)ketone is then reacted with ammonium carbonate and potassium cyanide in the conventional manner to obtain the corresponding hydantoin. If desired, the latter compound may then be reacted with a substantially equimolar amount of a pharmacologically acceptable acid to obtain the corresponding pharmacologically acceptable salts.

The following formulae and examples will illustrate this invention.

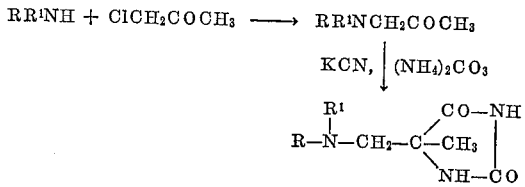

Example 1

2-chloroacetone (74.0 g., 0.8 mole) is added dropwise over a period of four hours to a solution of 68.0 g. (0.8 mole) of piperidine and 85 g. (0.85 mole) of sodium carbonate in 650 ml. of water. The reaction mixture is stored at room temperature for twenty hours, extracted with benzene, the extract washed with water, dried, and the solvent evaporated under reduced pressure. The residue is distilled under reduced pressure to yield N-piperidyl-acetone B.P. 140° C./9 mm.

In the same manner, but using the appropriate amine instead of piperidine, the following substituted acetones, some of which are characterized as their oxalate salts, are also obtained; N-morpholinylacetone, B.P. 80° C./0.7 mm.; N-1,2,3,4-tetrahydroisoquinolylacetone, B.P. 110° C./0.5 mm.; N'-benzyl-N-piperazinylacetone; N-hexamethyleneiminoacetone, B.P. 96–98° C./13 mm.; N-benzyl-N-isopropylaminoacetone, B.P. 128° C./12 mm.; N-benzyl-N-methylaminoacetone, B.P. 108° C./8 mm.; N-3,4 - dichlorobenzyl-N-methylaminoacetone, oxalate salt, M.P. 151–153° C.; N-2-chlorobenzyl-N-methylaminoacetone, B.P. 132° C./8 mm.; N-3-methoxylbenzyl-N-methylaminoacetone; N - 3,4-dimethoxybenzyl-N-methylaminoacetone, oxalate salt, M.P. 166–168° C.; N-4-methoxybenzyl-N-methylaminoacetone, oxalate salt, M.P. 168–170° C.

Example 2

N-piperidylacetone (45.39, 0.322 mole), obtained as described in Example 1, is added to a mixture of ammonium carbonate (309.1 g., 3.22 mole) and potassium cyanide (41.9 g., 0.644 mole). The mixture is stored at 55° C. for ten hours and then at room temperature for an additional ten hours. The solution is evaporated to one-third of the original volume and the crystals are collected by filtration. 5-methyl-5-N-piperidyl-methylhydantoin is recrystallized from ethanol to M.P. 228–232° C. The compound is identified by elemental analysis.

Examples 3 to 13

In the same manner as described in Example 2, but using the appropriate (tertiary amino)ketones obtained as described in Example 1 as the starting materials, reacting them with substantially 10 equivalents of ammonium carbonate and substantially 2 equivalents of potassium cyanide at temperatures between 45 and 65° C., preferably at 55° C., for periods of time of from six to twelve hours, preferably for ten hours, and then at room temperature for another period of substantially ten hours duration, the following 5,5-disubstituted hydantoins are obtained and are identified by elemental analysis.

| Example No. | Starting material (tert.amino)ketone | Final product hydantoin | M.P., °C. |
|---|---|---|---|
| 3 | N-morpholinylacetone. | 5-methyl-5-N-morpholinomethyl. | 206–210 |
| 4 | N-1,2,3,4-tetrahydroisoquinolylacetone. | 5-methyl-5-(N-1,2,3,4-tetrahydroisoquinolylmethyl. | 207–210 |
| 5 | N'-benzyl-N-piperazinylacetone. | 5-methyl-5-(N'-benzyl-N-piperazinylmethyl). | 210–113 |
| 6 | N-hexamethyleneiminoacetone. | 5-methyl-5-hexamethyleneiminomethyl. | 224–226 |
| 7 | N-benzyl-N-methylaminoacetone. | 5-methyl-5-N-methylbenzylaminomethyl. | 196–200 |
| 8 | N-2-chlorobenzyl-N-mehylaminoacetone. | 5-methyl-5-N-methyl-(2-chlorobenzylaminomethyl). | 165–167 |
| 9 | N-3,4-dichlorobenzyl-N-methylaminoacetone. | 5-methyl-5-N-methyl-(3,4-dichlorobenzylaminomethyl). | 178–179 |
| 10 | N-4-methoxybenzyl-N-methylaminoacetone. | 5-methyl-5-N-methyl-(4-methoxybenzylaminomethyl). | 186–188 |
| 11 | N-3-methoxy-benzyl-N-methylaminoacetone. | 5-methyl-5-N-methyl-(3-methoxybenzylaminomethyl). | 159–162 |
| 12 | N-benzyl-N-isopropylaminoacetone. | 5-methyl-5-N-isopropylbenzylaminomethyl. | 196–198 |
| 13 | N-3,4-dimethoxybenzyl-N-methylaminoacetone. | 5-methyl-5-N-methyl(3,4-dimethoxybenzylaminomethyl). | 160–162 |

I claim:
1. A compound of the formula

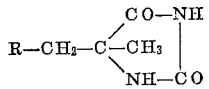

wherein R represents a monovalent basic radical selected from the group which consists of N-methyl-(2-chlorobenzylamino), N-methyl-(3,4-dichlorobenzylamino), N-methyl-(4-methoxybenzylamino), N-methyl-(3-methoxybenzylamino), and N - methyl - (3,4 - dimethoxybenzylamino).

2. 5 - methyl - 5 - N - methyl-(2-chlorobenzylaminomethyl)hydantoin.

3. 5-methyl - 5 - N - methyl-(3,4-dichlorobenzylaminomethyl)hydantoin.

4. 5-methyl - 5 - N - methyl-(4-methoxybenzylaminomethyl)hydantoin.

5. 5-methyl - 5 - N - methyl-(3-methoxybenzylaminomethyl)hydantoin.

6. 5 - methyl - 5 - N - methyl-(3,4-dimethoxybenzylaminoethyl)hydantoin.

References Cited

UNITED STATES PATENTS 2,290,281 7/1942 Henze _____ 260—309.5
2,615,897 10/1952 Persch et al. _____ 260—309.5

OTHER REFERENCES

Henze et al.: Jour. Amer. Chem. Soc. vol. 62, pp. 912–13 (1940).

HENRY R. JILES, *Primary Examiner.*

NATALIE TROUSOF, *Assistant Examiner.*

U.S. Cl. X.R.

260—239, 247.2, 247.7, 268, 287, 289, 294, 294.7, 570.9, 999